Patented Feb. 10, 1953

2,628,214

UNITED STATES PATENT OFFICE 2,628,214

CURING OF POLYETHYLENES

Paul S. Pinkney and Richard H. Wiley, Wilmington, Del., assignors to E. I. du Pont de Nemours & Company, Wilmington, Del., a corporation of Delaware No Drawing. Application October 27, 1945, Serial No. 625,110

2 Claims. (Cl. 260—63)

This invention relates to the treatment of polymeric materials and particularly to a process for the preparation of cured ethylene polymers. It also relates to novel compositions of matter comprising cured polymers of ethylene which are generally characterized by decreased solubility in organic solvents and decreased thermoplasticity; moreover, in particular instances, these cured polymers are substantially insoluble, and have exceptionally high zero strength temperature.

An object of this invention is to provide a process for decreasing the solubility and thermoplasticity of normally soluble thermoplastic and substantially saturated polymers (including copolymers) of ethylene thereby improving their utility for many purposes, such as for coating fabrics, paper, and electric conductors, as well as for the preparation of molded articles and water-resistant adhesives. Other objects appear hereinafter.

These objects are accomplished by intimately mixing a substantially saturated, preformed (i. e., pre-existing) polymer of ethylene with from 0.5 to 20% (preferably 5 to 10%), based on the weight of the polymer, of a free-radical liberating substance, and then heating the resulting composition to effect a "cure." Generally, the cure takes place when the polymer and curing agent are heated for not less than 1 minute at a temperature greater than about 40° C., preferably about 70° to 250° C. The polymers of ethylene which may be employed in the practice of this invention include the solid ethylene polymers described in U. S. Patents 2,153,553 and 2,188,465, and the polymers of ethylene with other polymerizable substances. Exemplary polymers of ethylene are disclosed in U. S. Patents 2,200,429, and 2,301,356, as well as in the copending application of W. E. Hanford and J. R. Roland, S. N. 446,116, filed June 6, 1942, and the copending application of M. M. Brubaker, S. N. 449,765, filed July 4, 1942.

In a preferred embodiment of this invention a normally solid ethylene polymer is intimately mixed with from 5 to 10% of benzoyl peroxide at the lowest possible temperature. For example, ethylene/vinyl acetate polymers having an E/VA (i. e. ethylene:vinyl acetate) ratio of from about 1:3 to about 20:1, or higher, can be conveniently compounded with benzoyl peroxide on rolls heated at about 35° to 105° C. When this is done the peroxide is first of all dissolved in about 10 times its weight of benzene and the resulting solution is then worked into the copolymer gradually. When the ethylene polymer is not sufficiently plastic at low temperatures (i. e. below ca. 105° C.) to be satisfactorily worked on a rubber mill, it is best to dissolve it together with the required amount of peroxide in a common solvent such as benzene at 80° to 105° C. In either case the solvent is removed after mixing is complete, and the substantially solvent-free compositions are then cured, that is, rendered less thermoplastic, by heating in a press under 20 to 1000 lbs./in.² pressure for about 5 minutes at 120° to 130° C. The partially cured products are relatively less soluble than the starting material, and are comparatively difficult to extrude. When the curing is complete, the product is substantially insoluble in solvents for the original polymer, and the temperature of zero strength is markedly raised. By "temperature of zero strength" is meant the temperature at which a film of the polymer has a tensile strength of substantially zero pounds per square inch.

Curing can be effected in an oven at ordinary pressures, but the best cures are usually obtained when the application of heat is very rapid, and for this reason heating by intimate contact with hot metal surfaces, as in a press, is preferred. Compositions cured under superatmospheric pressure are less likely to contain bubbles than are those cured under atmospheric pressure.

The following examples will serve to illustrate the invention more fully. All parts are by weight.

*Example 1.*—The following ingredients are mixed on a rubber mill for 10 to 15 minutes at 105° C.: 100 parts of a solid ethylene polymer having a molecular weight of 15,000 and 22 parts of "Luperco A" (a commercial preparation containing about 20% benzoyl peroxide). The homogenized composition is then removed from the rolls and heated for 15 minutes at 130° C. between flat metal sheets in a press. The cured product is substantially insoluble in organic solvents and has markedly decreased thermoplasticity as shown by the following data.

|  | Sticking Temp.,[1] °C. | Solubility in Boiling Xylene |
|---|---|---|
| Before heating at 130° C. | 105 | Dissolves readily. |
| After heating at 130° C. | 300 | Swells but does not dissolve. |

[1] Temperature at which composition begins to stick to a heated brass block.

The composition described in the above example is particularly useful as water-resistant adhesive for joining surfaces of wood, metal, glass, rubber, leather, or of various plastics such as urea/formaldehyde, phenol/formaldehyde, cellulose acetate, etc. When used for this purpose, it is often most convenient to apply the uncured composition in the form of a lacquer in a solvent such as benzene, xylene, or toluene, and thereafter to effect the curing in situ.

*Example 2.*—The following ingredients are compounded on a rubber mill for 10 minutes at 35° C.: 100 parts of ethylene/vinyl acetate polymer (E&VA mol ratio 3/1, 22 parts of "Luperco A." The homogenized composition is then heated between flat metal sheets in a press for 15 minutes at 130° C. The cured composition is substantially insoluble and has markedly decreased thermoplasticity as indicated by the following table which compares the properties of the peroxide-cured ethylene/vinyl acetate polymer with the original polymer.

|  | Sticking Temp., °C. | Solubility in Benzene |
| --- | --- | --- |
| Unmodified E/VA | 60 | Dissolves in cold solvent. |
| Peroxide-cured E/VA | 300 | Swells but is insoluble in boiling solvent. |

Compositions of this type are well suited for calender-coating fabric. For example, fabric coated with a composition comprising 100 parts of an ethylene/vinyl acetate polymer (E/VA mol ratio 3/1), 100 parts of "Kalvan" (calcium carbonate), 22 parts of "Luperco A," 6 parts of palm oil, and 2 parts pigment can be cured by heating in a press or an oven for 15 minutes at 130° C. to give a product which is pliable over a wide temperature range, abrasion resistant, resistant to organic solvents or boiling water, which does not become tacky at temperatures as high as 250° C. The calcium carbonate filler in this composition has a marked reinforcing action.

*Example 3.*—The following ingredients are compounded on a rubber mill for 10 minutes at 80° C.: 100 parts of ethylene/vinyl acetate polymer (E/VA mol ratio=8/1), 22 parts of "Luperco A." The homogenized composition is then heated between flat metal sheets in a press for 15 minutes at 140° C. As indicated in the following table, the peroxide-cured polymer is substantially insoluble and has markedly decreased thermoplasticity.

|  | Sticking Temp., °C. | Solubility in Benzene |
| --- | --- | --- |
| Unmodified E/VA | 100 | Dissolves readily on warming. |
| Peroxide-cured E/VA | 300 | Swells but does not dissolve in boiling solvent. |

Compositions of the type described in the foregoing example are eminently suited for use as water-resistant, thermo-setting adhesives. For example, a plywood adhesive is prepared by dissolving 15 parts of ethylene/vinyl acetate polymer having an E/VA ratio of 8/1 and 1.5 parts of benzoyl peroxide in 85 parts of benzene at slightly elevated temperature (50 to 60° C.). The resulting warm solution is spread in two coats on three plies of 1/16" birch veneer to give approximately 20 pounds of solids per 1000 sq. ft. of glue line. The solvent is allowed to evaporate at room temperature for 3 to 4 hours. The coated panels are then assembled with the center panel cross-grain to the outer plies, and pressed at 130° C. for 15 minutes under 200 lbs. per sq. in. pressure. The resulting plywood has shear strength values of 570 lbs. per sq. in. when tested dry, 325 lbs. per sq. in. when tested wet after 48 hours immersion in water at room temperature, and 280 lbs. per sq. in. when tested wet after 3 hours immersion in boiling water.

Other surfaces besides wool can be joined satisfactorily with adhesives of this type; for example, glass, metal, cloth, cement, plastics, and the like. The preparation and use of an adhesive composition for metal is described in the following example.

*Example 4.*—A mixture of 180 parts of a polyethylene having a melt viscosity of 41 poises at 175° C. and a melting point of 105° C., with 20 parts of polyisobutylene (Vistanex B–60), and 20 parts of #1 Yellow carnauba wax is thoroughly homogenized in a Banbury mixer at a temperature of 110° C. Cooling water is then passed slowly through the jacket of the mixer and 10 parts of linoleic acid added to the batch in three portions. When the temperature of the composition has reached 75° C., 10 parts of "Triton" NE (a nonionic dispersing agent which, according to the description given in Ind. Eng. Chem. 35, 130 (1943), is an aryl alkyl polyether alcohol prepared by reaction of ethylene oxide with an alkyl phenol) is added in three portions and mixed thoroughly. Thereupon 100 parts of water are added in 8–10 equal portions, a mixing period of 3–4 minutes being employed after each addition to permit through dispersion of the water. In the later stages of water addition, the mixture is pressed against the rotating blades by means of a ram, which is lowered into the mixer after each addition to facilitate the incorporation of the water into the stiff pasty mass. When the addition of 100 parts of water is complete, a solution of 3 parts of casein and 8 parts of concentrated ammonium hydroxide in 20 parts of water is added in two equal portions. Thereupon the mixture inverts from the stiff water-in-oil emulsion to a much more fluid oil-in-water type dispersion and this is discharged from the mixer and diluted with 100 parts of water in ordinary mixing equipment. The average particle size of the resulting fluid dispersion is 1.5–2 microns.

A portion of the dispersion is mixed with sufficient of a 45% aqueous dispersion of benzoyl peroxide in water (Luperox #1) to produce a 5% benzoyl peroxide content based on the total polymer.

Sheets of 1 mil hard aluminum foil are coated with the dispersion and allowed to air-dry. Two of the coated surfaces are pressed together under moderate pressure at a temperature of 140° C. for a period of 30 seconds. The strength of the bond is high and application of a quick pull tears the aluminum foil. A slow pull causes rupture of the bond through the adhesive layer.

When the benzoyl peroxide-containing dispersion is replaced by the unmodified dispersion the bonds are found to have very little strength and the adhesive layer strips away cleanly from the aluminum surfaces.

While it has been found essential to employ the general procedure outlined above to obtain suitable dispersions, several modifications in ingredients can be made without effecting the quality of the dispersion. Thus, the polyisobutylene may be replaced by polypropylene and the carnauba wax may be omitted entirely, although if this is done a longer cycle is required to produce the dispersion. Further, the linoleic acid may be replaced by oleic or palmitic acids, and "Triton" NE may be replaced by such commercial nonionic dispersants as "Emulphor" O and "Tweens." ("Emulphor" O is considered to be a polyglycol ether. "Tweens" is an ethylene oxide reaction product of a fatty oil ester of sorbitan according to the description given in Ind. Eng. Chem. 35, 130 (1943).) Finally, in place of the casein such polymeric dispersing agents as polyvinyl alcohol and polyacrylic or methacrylic acids may be employed.

*Example 5.*—Twenty parts of a soluble ethylene/carbon monoxide polymer having an E/CO mol ratio of 1.5:1 and 2.5 parts of "Luperco A" are milled in a cold rubber mill until homogeneous. The resulting composition is molded at 100° C. for 15 minutes under 500 lbs. per sq. in. The molding obtained in this fashion is tough, insoluble in organic solvents, and does not soften or become tacky at 300° C.

*Example 6.*—One hundred parts of solid polymer of ethylene and 10 parts of chloramine T are mixed on a rubber mill at 110° C. The homogenized composition is then heated between flat metal sheets in a press for 15 minutes at 140° C. The resulting product does not dissolve in boiling toluene and its temperature of zero strength is above 250° C.

*Example 7.*—One hundred parts of a solid polymer of ethylene and 10 parts of lead diethyl dibromide are mixed on a rubber mill at 110° C. The homogenized composition is then heated in a press for 15 minutes at 140° C. The resulting product does not dissolve in boiling toluene and its temperature of zero strength is above 250° C.

*Example 8.*—One hundred parts of an ethylene/vinyl acetate polymer having an E/VA mol ratio of 2.3, and 10 parts of lauroyl peroxide are mixed on a rubber mill at 35° C. The homogenized composition is then heated between flat metal sheets in a press for 15 minutes at 140° C. The resulting product does not dissolve in boiling benzene and its temperature of zero strength is greater than 275° C. The uncured polymer is soluble in cold benzene and its temperature of zero strength is about 85° C.

*Example 9.*—Ten parts of the ethylene polymer in Example 1 is heated to 110° to 120° C. on steam heated mixing rolls. To the polymer on the rolls is added 1 part of tertiary butyl perbenzoate dissolved in 5 parts of xylene, the mixture worked on the rolls until it is substantially free of xylene, and then removed from the rolls in the form of a sheet. The homogenized composition is soluble in hydrocarbon and halogenated hydrocarbon solvents. The sheet is transferred to a press and heated under pressure between flat metal sheets at 140° C. for 5 minutes. The press is allowed to cool, the pressure is released and the sheet is removed. The resulting sheet is found to be insoluble in solvents for the untreated ethylene polymer.

*Example 10.*—Ten parts of ethylene polymer of Example 1 and 1 part of acetyl benzoyl peroxide, dissolved in 10 parts of xylene are thoroughly mixed at 50° to 75° C. on heated mixing rolls and the blend worked on the rolls until it is substantially free of xylene. The resulting blend is still soluble in hydrocarbon and halogenated hydrocarbon solvents. After heat-treatment for 5 minutes at 140° C. between metal sheets in a press the blend is found to be insoluble in solvents for the untreated ethylene polymer.

The soluble, substantially saturated, thermoplastic polymers of ethylene which can be used in the process of this invention include polymers obtainable from ethylene alone, and polymers of ethylene with at least one other organic compound containing polymer-producing unsaturation, such as is present in carbon monoxide and in compounds containing the ethylene linkage >C=C<. These compounds include vinyl compounds, such as acrylic acid, esters, nitrile, etc., vinyl esters such as vinyl acetate, propionate, chloride and the like; vinylidene compounds exemplified by alkacrylic acids, esters, nitriles, vinylidene halides, etc., and butendioic acid compounds such as maleic or fumaric acids and derivatives thereof.

Any organic compound, such as an organic peroxide, capable of generating free radicals when heated below 200° C. can be used to cure the ethylene polymers described above. Thus in addition to the diacyl peroxides, including benzoyl peroxide and lauroyl peroxide, which are highly effective as curing agents, the following materials may also be used: substances, such as oxygen which react with organic materials to form organic peroxides; dialkyl peroxides such as diethyl peroxide, ditertiary butyl peroxide, diisopropyl peroxide; hydroperoxides such as hydroxymethyl hydroperoxide, tertiary butyl hydroperoxide, ethyl hydroperoxide etc.; peracids, such as acetoperacid, benzoperacid, succinic monoperacid, phthalic peracid, trimethylacetoperacid; peresters, exemplified by ethyl percamphorate, or esters of perbenzoic acid such as ethyl perbenzoate or tertiary butyl perbenzoate, compounds containing an $$\overset{|}{\underset{|}{N}}-Cl$$

grouping, particularly the organic N-chloro derivatives of amines or amides such as chloramine T, dichloramine T, or chloramine B (sodium-N-chlorobenzene-sulfonamide); metal alkyl derivatives, such as lead tetraethyl or lead diethyl dibromide; amine oxides such as triethylamine oxide; hydrazine salts and derivatives such as hydrazine hydrate, hydrazine hydrochloride, hydrazine sebacate or dibenzoyl hydrazine; azino compounds, such as diphenyl ketazine, aldazines, etc. As a rule, it is preferable to select a curing agent that is relatively stable below about 100° C. and substantially non-volatile at temperatures encountered during curing.

The amount of free-radical generating compound used in carrying out the process of this invention depends on the nature of the polymer, the type of curing agent and the degree of modification desired. Thus, small amounts of benzoyl peroxide (0.5 to 2% based on the polymer) often gives insoluble compositions, without markedly affecting the thermoplastic properties while larger amounts usually give substantially insoluble products of markedly reduced thermoplasticity. Generally speaking, 5 to 10% of benzoyl peroxide gives the best results.

The conditions of temperature and time required by the process of this invention depend on the stability and amount of curing agent employed and the nature of the polymer. For example, normally solid polyethylenes or ethylene/vinyl acetate polymers containing 10% benzoyl peroxide, when heated for about 1 to 15 minutes at 130° C. to 150° C., become substantially insoluble in organic solvents and have greatly reduced thermoplasticity, while normally solid polyethylenes containing 10% Chloramine T require 10 to 15 minutes at 140° to 170° C. to obtain the same degree of cure. By prolonging the curing time to 6 hours a substantial degree of insolubilization of polyethylene can be brought about at 75° C. using 0.8% of benzoyl peroxide. On the other hand, ethylene/carbon monoxide polymers can be cured with peroxides under somewhat milder conditions, i. e., 1 to 10 minutes at 100° C. Curing can, of course, be carried out under pressure of 20 to 1000 lbs./in.$^2$ in a mold or, if desired, in an oven atmospheric pressures.

The admixture of peroxide and polymer can be effected by any convenient method. For example, the polymer and curing agent can be mixed directly on a two-roll rubber mill with or without the use of small amounts of a solvent, which plasticizes the polymer temporarily. If desired, any standard mixing equipment may be used. The ingredients can also be dissolved in a mutual solvent or dispersed in water and then cast or extruded as a film, fiber, tube, etc. The curing agents previously enumerated can also be incorporated in the polymers by immersing the latter in a solution of the former at a temperature low enough to prevent the polymers from dissolving, but high enough to cause them to be swollen by the solvent employed. The amount of curing agent introduced by this technique, and the rate at which the curing agent diffuses in the polymer will depend on the nature and temperature of the solvent, the concentration of the curing agent, and the magnitude of the polymer-surface interface. Thus, by way of example, films of a normally soluble polymer of ethylene can be made substantially insoluble and less thermoplastic by immersing them for 1–15 minutes in a 13% xylene solution of benzoyl peroxide at 60–70° C., then removing the films from the impregnating bath and heating them for a few minutes at 120–145° C. in a press or an oven. Solvents other than xylene may be used to dissolve the curing agents, the preferred being those that exert a swelling action on the polymer in question at their boiling points or lower temperatures. By way of another example, a normally solid ethylene polymer may be extruded about a wire, the coated wire passed through a bath containing the curing agent, for example (tertiary butyl perbenzoate), and then heated to cure the coating on the wire. The major advantages of this diffusion technique for adding curing agents to ethylene polymers and interpolymers are the ease with which it can be applied to preformed articles including: moldings of all sorts, extruded wire coatings, solvent-cast or extruded films and fibers, and protective coatings of all types; and the fact that it circumvents most of the problems arising from the premature decomposition of the curing agent that are encountered when other methods of blending are used.

In addition to the polymer and curing agent the compositions may contain suitable fillers, pigments, or plasticizers.

Examples of suitable fillers are calcium carbonate, iron oxide, and crown clay.

Fabrics coated with ethylene/vinyl acetate polymers cured with benzoyl peroxide and filled with calcium carbonate, iron oxide, or crown clay are markedly tougher and more serviceable than uncured filled or cured unfilled coatings.

Peroxide-containing aqueous dispersions of the polymer are particularly suited to coating applications involving fabric, paper or wood since the coating layers may be put in place without the application of heat, thereby reducing the possibility of premature curing. This property is of particular advantage in the preparation of adhesive compositions in which premature curing must be avoided.

The word "polymer" is used herein in a generic sense to refer to polyethylene and to polymers of ethylene with at least one other organic compound containing a polymer-producing unsaturated linkage.

This application is a continuation-in-part of our copending application S. N. 547,808, now abandoned, which was filed August 2, 1944.

Since many apparently different embodiments of this invention may be made without departing from the scope and spirit thereof it will be understood that we do not limit ourselves except as set forth in the following claims.

We claim:

1. A process for curing a preformed solid ethylene polymer which comprises admixing the said ethylene polymer with from about 0.5 to 20% by weight of benzoyl peroxide, and thereafter heating the resultant mixture at a temperature within the range of 70° to 250° C.

2. The process for curing a preformed solid ethylene-carbon monoxide interpolymer which comprises admixing the said ethylene-carbon monoxide interpolymer with from about 0.5 to 20% by weight of benzoyl peroxide, and thereafter heating the resulting mixture at a temperature within the range of 70° to 250° C.

PAUL S. PINKNEY.
RICHARD H. WILEY.

REFERENCES CITED

The following references are of record in the file of this patent:

UNITED STATES PATENTS

| Number | Name | Date |
|---|---|---|
| 2,282,002 | Scott | May 5, 1942 |
| 2,430,993 | Rehner | Nov. 18, 1947 |
| 2,442,330 | Fuller | June 1, 1948 |
| 2,455,910 | Alderson | Dec. 14, 1948 |
| 2,462,674 | Rehmer | Feb. 22, 1949 |

OTHER REFERENCES

Twiss: "Advancing Fronts in Chemistry," vol. I, "High Polymers," Reinhold (1945), pages 48 and 49.